US007676688B1

(12) United States Patent  
Hardman (10) Patent No.: US 7,676,688 B1
(45) Date of Patent: Mar. 9, 2010

(54) CONCURRENT DATA BROADCAST OF SELECTED COMMON GROUPS OF DATA BLOCKS

(75) Inventor: Daniel H. Hardman, American fork, UT (US)

(73) Assignee: Symantec Corporation, Mountain View, CA (US)

( * ) Notice: Subject to any disclaimer, the term of this patent is extended or adjusted under 35 U.S.C. 154(b) by 1393 days.

(21) Appl. No.: 11/081,338

(22) Filed: Mar. 16, 2005

(51) Int. Cl.
*G06F 11/00* (2006.01)
(52) U.S. Cl. .......................................... 714/6; 713/163
(58) Field of Classification Search ................ 714/6, 714/2, 4, 18, 20; 713/163
See application file for complete search history.

(56) References Cited

U.S. PATENT DOCUMENTS

| | | | |
|---|---|---|---|
| 5,561,637 A * | 10/1996 | Dan et al. .............. | 365/230.03 |
| 6,148,414 A * | 11/2000 | Brown et al. .................... | 714/9 |
| 6,658,526 B2 * | 12/2003 | Nguyen et al. .............. | 711/111 |
| 6,834,326 B1 * | 12/2004 | Wang et al. ................. | 711/114 |
| 7,366,172 B2 * | 4/2008 | Chou et al. ................. | 370/389 |

* cited by examiner

*Primary Examiner*—Dieu-Minh Le
(74) *Attorney, Agent, or Firm*—Advantedge Law Group (57) ABSTRACT

Mechanisms for data source computing system(s) to provide data to data targets. The data source(s) access an identification of common groups of blocks, each group being common amongst all or a subset of the data target(s). The common groups of blocks may have different scope such that one common group of blocks is to be provided to a different set of the data targets than another common group of blocks. Optionally, a selection mechanism may be used to assign priority in initiating multicasting of the identified common groups of blocks. The data source(s) then initiate multicasting of the common groups of blocks in the appropriate order to the appropriate data targets. Since the common groups of blocks are provided in a single multicast, rather than separately, the data is provided in a more efficient manner to the data targets.

22 Claims, 4 Drawing Sheets

CONCURRENT DATA BROADCAST OF SELECTED COMMON GROUPS OF DATA BLOCKS

BACKGROUND OF THE INVENTION

1. The Field of the Invention

The present invention relates to computing technology; and more specifically, to mechanisms for efficiently broadcasting common groups of data blocks to a plurality of primary computing systems in which one common group of data blocks may be common among a different set of the primary computing systems than another common group of data blocks.

2. Background and Related Art

Computing technology has transformed the way we work and play. Businesses, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system.

At some point, the data at the primary computing system may become inaccessible or otherwise lost. For example, the data may become corrupted due to a system failure or viral infiltration. Software (such as the operating system, application, or drivers) needed to access the data may also be corrupted. Furthermore, hardware needed to access the data may become damaged. For instance, the disk drive or computing system may become damaged by a wide variety or realistic scenarios. The computing system may be dropped in the case of a portable system, or may even be intentionally harmed by a user or passerby. A wide variety of possible natural disasters may also harm the primary computing system. Whatever causes the failure, recovery occurs by restoring or replacing any needed hardware for the primary computing system, and then copying disk sectors from the backup computing system back to the primary computing system.

In larger enterprises, there may be many primary computing systems that may need to have restored access to data and other computing functionality. When recovering data access after such a failure, time is money. Depending on the enterprise size and operation, each minute without operational data may mean thousands, or even millions, of dollars in lost revenue. Enterprises that are serious about disaster recovery typically have elaborate plans for how to quickly acquire replacement telephone lines, office space, and computer hardware.

Once all the physical building blocks of a site are assembled, backups from the destroyed site are restored as quickly as possible to bring key servers back to an operational state, and then systems management software redeploys a standard image to desktops. An important limiting factor in the restore process is the sheer amount of data that is read from I/O on the backup computing system resource hosting the backups, pushed across the network, and written to waiting hard drives of the primary computing systems.

To demonstrate how time consuming this restoration can be, suppose that a data center has 100 servers that each uses 100 gigabytes (GB) of storage. In that scenario, 10 terabytes (TB) of data is read from the backup, transferred to the servers, and written to the server hard drives before the servers can be brought online. The time required to transfer this data can be mitigated by using disk-to-disk technology, faster networks, backups with improved read speeds, and servers with faster write speeds, but much time is still wasted.

Accordingly, what would be advantageous are mechanisms for quickly recovering data access to multiple primary computing systems.

BRIEF SUMMARY OF THE INVENTION

The foregoing problems with the prior state of the art are overcome by the principles of the present invention, which are directed towards mechanisms for one or more data source computing systems to provide data to a plurality of data targets. The data source(s) access an identification of common groups of blocks, each group being common amongst all or a subset of the data target(s). The common groups of blocks have different scope such that one common group of blocks is to be provided to a different set of the data targets than another common group of blocks. Optionally, a selection mechanism may be used to determine priority for initiating multicasting of the common groups of blocks to multicast next. The data source(s) then multicasts each of the common groups of blocks to the appropriate subset of the data targets.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for one or more data source computing systems to provide data to a plurality of data targets. The data source(s) access an identification of common groups of blocks, each group being common amongst all or a subset of the data target(s). The common groups of blocks may have different scope such that one common group of blocks is to be provided to a different set of the data targets than another common group of blocks. Optionally, a selection mechanism may be used to assign priority in initiating multicasting of the identified common groups of blocks. The data source(s) then implement the multicasting priority by initiating multicasting of the common groups of blocks in the appropriate order to the appropriate data targets. Since the common groups of blocks are provided in a single multicast, rather than separately, the data is provided in a more efficient manner to the data targets. In a recovery environment involving many primary computing systems as data targets, this may translate in many circumstances to faster recovery of the various primary computing systems.

First, a general computing system will be described with respect to FIG. 1, as being a suitable computing system that may be used to practice the principles of the present invention. Then, the principles of the present invention will be described with respect to FIGS. 2, 3 and 4.

Figure 1:
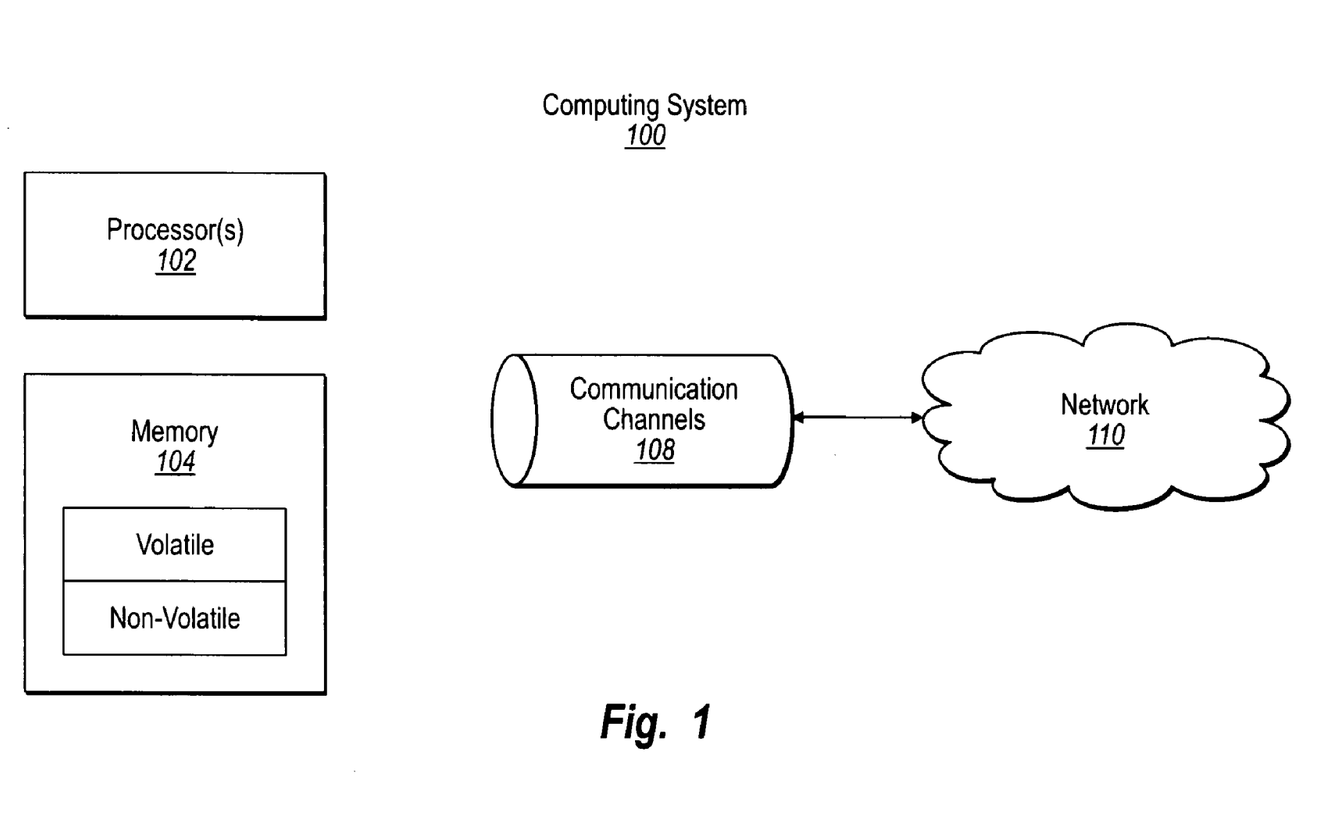
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasing taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable and non-removable, and may include (but not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
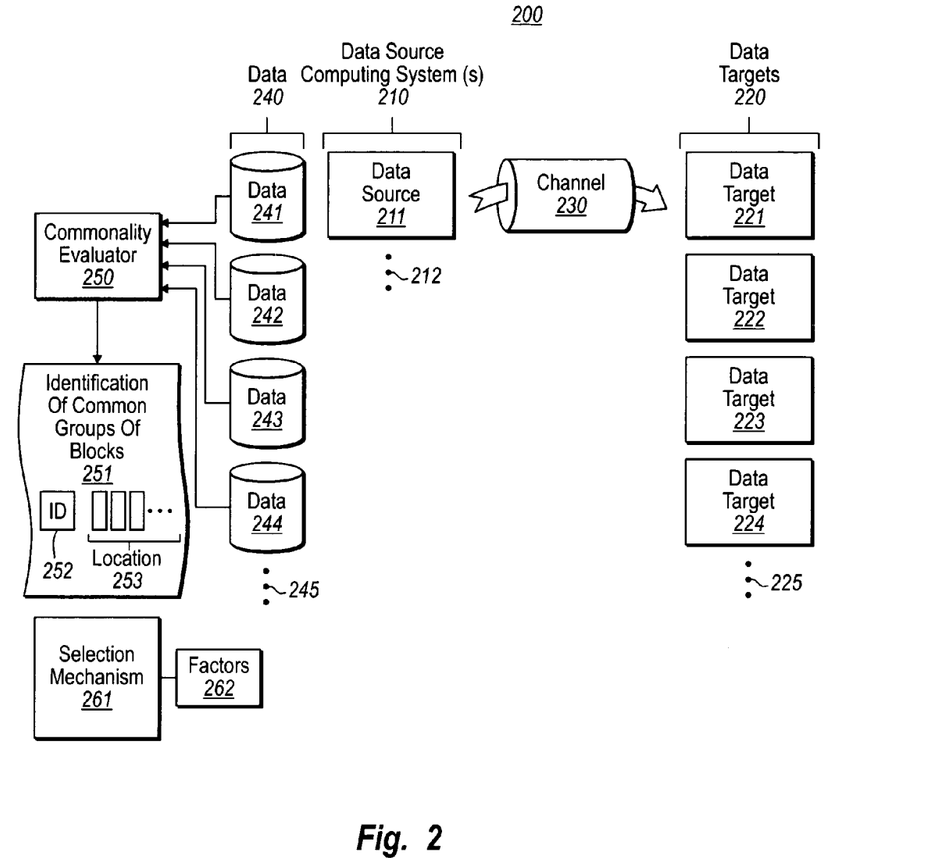
FIG. 2 illustrates a general environment in which the principles of the present invention may be employed including one or more data source computing systems that provide individualized data to a number of data targets, and which includes an identification of a number of common groups of blocks, a selection mechanism for determining priority in multicasting the common groups of blocks.

FIG. 2 illustrates an environment 200 in which the principles of the present invention may be employed. The environment 200 includes one or more data source computing systems 210 that are to communicate respective data 240 over channel 230 to respective data targets 220. Data source computing system(s) 210 is illustrated as including at least data source computing system 211 amongst potentially others as represented by the vertical ellipses 212. If there are two or more data source computing systems, then the data source computing systems may cooperatively interact to perform data sourcing operations described herein.

The data targets 220 are illustrated as including four data targets 221, 222, 223 and 224 amongst potentially others as represented by the vertical ellipses 225. The data targets may be computing systems, or may be just components of a computing system such as, for example, a hard drive, another persistent memory component, or even a volatile memory component. Although four data targets 220 are shown, the principles of the present invention are applicable for data transfer from data source computing system(s) to any two or more data targets.

The data is to be communicated over channel 230, which may be any medium that permits the data to be conveyed from the data source computing system(s) to the appropriate data target 220. This channel 230 may be a Wide Area Network, a Local Area Network, any other type of network, and may even be non-network channels. For instance, the channel 230 may be a local bus.

The environment 200 facilitates that transfer of target-specific data to appropriate targets. For instance, data 241 is to be provided to data target 221, data 242 is to be provided to data target 222, data 243 is to be provided to data target 223, and data 244 is to be provided to data target 224. Of course, if there were other data targets as represented by the vertical ellipses 225, then there would be further data (as represented by vertical ellipses 245) that would be restored to those data targets.

The data may include any information whatsoever and may include not just application data, but also an application itself (or portions thereof), an operating system (or portions thereof), or configuration information for an application(s) or an operating system. In one embodiment, the corresponding data to be conveyed to a data target may be a drive image previously taken from a primary computing system. In that case, the data source computing system(s) may serve as a backup computing system, and the data may be used to restore the associated primary computing system back to full operation.

The data 241 through 244 is specific for each data target 221 through 224. Nevertheless, there may be significant redundancies between each of the data 241 through 244. For instance, suppose that the data 241 through 244 represents a backup image of an entire drive. That drive may include significant quantities of executable instructions associated with an operation system or applications that are common to all of the primary computing systems from which images were taken.

Accordingly, the environment 200 includes a commonality evaluator 250, which evaluates each of the data 241 through 245 to determine what blocks of the data are in common to any group of two or more of the data targets 220. Although not required, such blocks may be of fixed length. When working with data associated with a disk drive, it is often convenient to work with block sizes of a single sector, a single cluster, or an integer multiple of a sector or cluster. However, the principles of the present invention may also work with block sizes such that one or both boundaries do not coincide with a sector or cluster boundary.

The commonality evaluator 250 may periodically or continuously evaluate the current state of the data 240 to search for common groups of data blocks. In a backup environment, the commonality evaluator 250 might, perhaps, evaluate for commonality after each backup, or periodically assuming that a backup has occurred since the time of the last evaluation. The commonality evaluator 250 may adaptively determine an appropriate period for evaluation given the current circumstances. For example, if changes are made infrequently to the data 240 and only to small portions of memory, then evaluation may be performed less frequently that if the data 240 is changed often and/or to larger portions of the memory.

The commonality evaluator 250 may evaluate in a number of different ways. In one example, the commonality evaluator 250 evaluates hash values corresponding to segments of the data. If a match is found in that the hash value for a portion of one data (e.g., data 241) matches the hash value for a portion of another data (e.g., data 242), then they may be determined to match if the risk associated with a false positive for the hash is acceptable. Otherwise, the associated potentially matched segments may be compared byte-by-byte to confirm the match, or perhaps hashes associated with a smaller sub-portion of the segments may be compared.

When a match is found, the community evaluator 250 notes the match, and notes the two or more data that have the associated commonality. Also, since the matched data may occur at different address locations in the associated data, the address for the match is also noted if not implied. The match information is then written to one or more data structures such as, for example, the identification data structure 251 that identifies 252 the common group of blocks as well as the address location 253 of each matching block in each associated data. For instance, suppose that there were 200 clusters of matching data in each of data targets 242, 243, and 244, but not data target 241. The identification data structure 251 would identify the matching data as well as the address locations of the matching data in the data 242, the address locations of the matching data in the data 243, and the address locations of the matching data in the data 244. The remainder of FIG. 2 will be described after the following description of FIG. 3.

Figure 3:
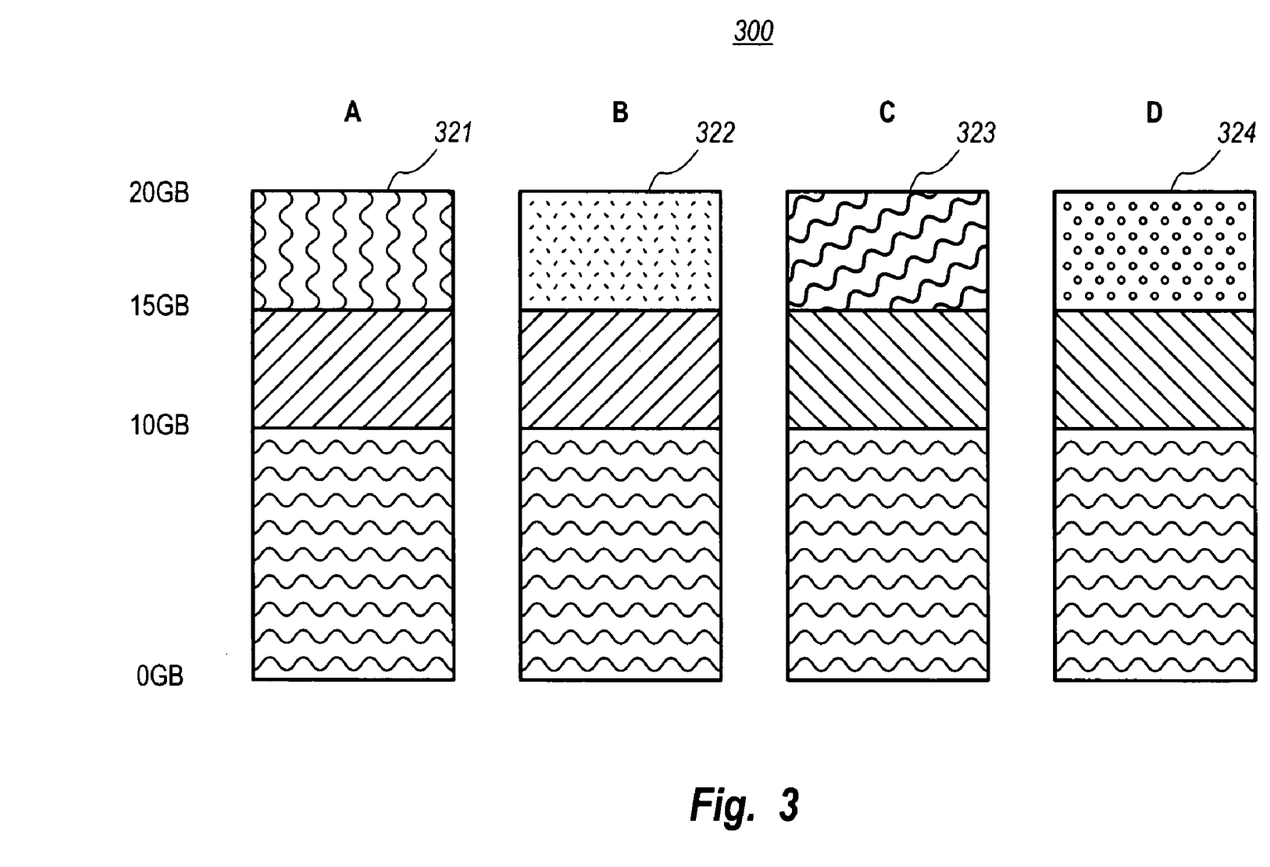
FIG. 3 illustrates an example layout of multiple data sequences having three common groups of blocks.

FIG. 3 illustrates an example data sequence layout associated, each to be provided to one of four data targets, and having three common groups of blocks. The example is intentionally simple in order not to obscure the general principles of the present invention. Once the simple example is described and the foundation for the general principles of the present invention are properly established, certain complexities will then be introduced.

In the simplified example of FIG. 3, there is shown the general layout of four data sequences to be conveyed to data targets. For instance, data sequences 321 through 324 may correspond to the data 241 through 244 of FIG. 2. Referring to FIG. 3, each data sequence is 20 gigabytes (20 GB) in size. The lower 10 GB of the data is common amongst all four of the data sequences. This is represented by each of these lower 10 GB being filled in with horizontal oscillating lines. The data between addresses 10 GB and 15 GB in both data sequences 321 and 322 is also common, as represented by the corresponding segments both being filled with forward-slanting diagonal lines. The data between addresses 10 GB and 15 GB in both data sequences 323 and 324 is common, as represented by the corresponding segments both being filled with backward-slanting diagonal lines. The upper 5 GB of each of the data segments 321 through 324 are not identified as being in common as represented by each of these segments being filled with a unique pattern.

In this example, there are three identified common groups of blocks identified as follows in Table 1:

TABLE 1

| Common Group Number | Location Information |
|---|---|
| 1 | 0 GB to 10 GB on sequence 321; 0 GB to 10 GB on sequence 322; 0 GB to 10 GB on sequence 323; and 0 GB to 10 GB on sequence 324. |
| 2 | 10 GB to 15 GB on sequence 321; and 10 GB to 15 GB on sequence 322. |
| 3 | 10 GB to 15 GB on sequence 323; and 10 GB to 15 GB on sequence 324. |

Having described the simple example of FIG. 3, there are certain further complexities. For instance, although each common group of blocks is shown as being contiguous in FIG. 3 for each particular data sequence, the common group of blocks may not be contiguous at all. In that case, the location information should be sufficiently comprehensive such that the data target may know where to write each portion of the common group of data. In addition, the number of blocks in any given common group of blocks may be any number. In some cases, the level of redundancy between a group of computing systems may be quite high. In that case, there may be a common group of blocks that occupy much of the data to be transferred. Furthermore, although there are only three common groups shown in FIG. 3, in implementation, there may be typically many more, or even hundreds or thousands, of such common groups.

Figure 4:
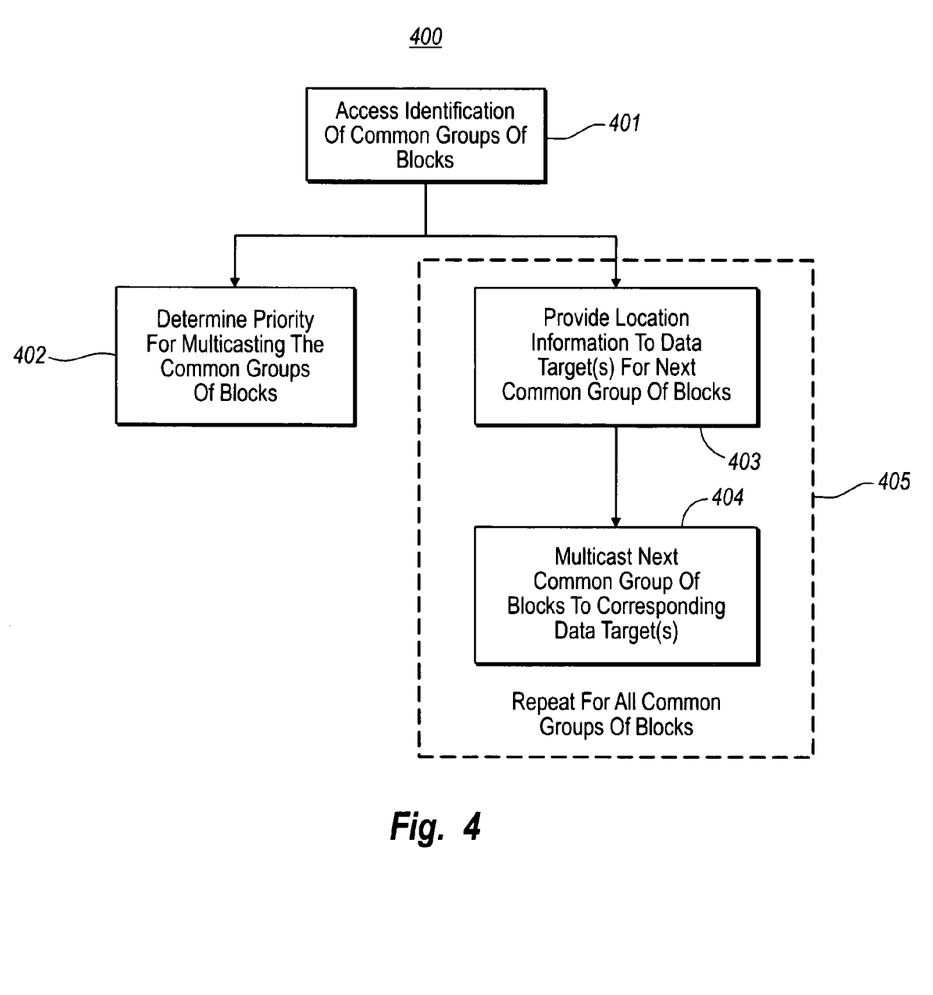
FIG. 4 illustrates a method for providing common groups of blocks to data targets in accordance with the principles of the present invention.

FIG. 4 illustrates a flowchart of a method 400 for one or more data source computing systems to provide data to a plurality of data targets. As the method 400 may be performed within the environment 200, the method 400 will be described with frequent reference to FIG. 2, and also with some reference to the simplified example of FIG. 3.

Following the method 400, the data source computing system(s) 210 accesses identification of a plurality of common groups of blocks amongst all or a subset of the plurality of data targets (act 401). For instance, the data source computing system(s) 210 may access the identification data structure 251. The commonality evaluator 250 and/or the identification data structure 251 may be located external to the data source computing system(s) 210. In that case, the act 401 may involve accessing the identification from external to the one or more data source computing systems. On the other hand, the commonality evaluator 250 may also be implemented within the data source computing system(s) 210. In that case, the act 401 may involve accessing the identification internally, or even internally generating the identification data structure 251.

Optionally, a selection mechanism 261 may be used to determining a priority for multicasting the common groups of blocks. This priority may be used for determining whether initiation of multicasting for one common group of blocks should be done before initiation of multicasting for a second common group of blocks. In this description and in the claims, the use of the term "first" and "second" is used to merely distinguish one item from another, and is not used to imply any positioning in space or chronological time, unless expressly stated. The factors 262 for determining such a priority will be described further below.

The two acts within the dashed box 405 are performed for each common group that is to be multicast to two or more data targets. Before each multicast of a common group of blocks begins, the data source computing system(s) 210 provides location information to each data target that has the common group of blocks in common (act 403). An example of such location information is, for example, the location information 253 of FIG. 2. As previously mentioned, this location information specifies at what address(es) to store the common group of data blocks since each data target may store a given common group of blocks in a different memory location.

After the data target is provided with the location information (act 403) or otherwise after there is some other confirmation that the data target will know where to put the multicast data, the data source computing system(s) multicasts the corresponding common group of blocks to the appropriate data targets (act 404). In this description and in the claims, "multicasting" of data from a source to multiple targets means that the source successfully provides only once the multicast data over the communication channel. Some multicasting may have built-in acknowledgment based reliable messaging such that successful delivery is guaranteed, or if delivery is futile, even after multiple attempts, there is notification of the delivery failure. The multiple targets each receive a copy of the multicast data from the channel. In the case of multicasting, bandwidth of the channel 230 is preserved since the common group of blocks need only be dispatched once (assuming that there are no errors in the multicasting) into the channel 230 for all data targets that have the blocks in common, rather once for each data target.

As previously mentioned, the acts 403 and 404 may be performed for each common group of blocks. It is not necessary for the location information for a given common group of blocks to be provided just before the associated common group of blocks is multicast. Such location information, if used, may be provided at any point prior to the associated multicast transmission. In one embodiment, all of the location information is provided to the various data targets prior to the multicasting of any of the common groups of blocks.

Furthermore, the reason for providing the location information prior to multicasting the associated common groups of blocks is so that the data target will immediately know where to write each portion of the common group of blocks. However, if the data target has sufficient buffering capability, the data target may simply buffer any portion of the common group of blocks that it does not know where to write. In that case, the location information may arrive at the data target after the common groups of blocks. Once the location information arrives, the data target may then empty the buffer and write the buffered data to the appropriate address locations.

Also, it is not necessary for the multicasting of one common group of blocks to be complete before multicasting of the next common group of blocks is initiated. Some channels, for example, may have multiple read channels whereby a data sequence may be read from the data source computing system(s) onto a channel, several transfer channels on the channel itself, and several write channels whereby data sequences are written from the channel onto the data target. Accordingly, there may be multiple parallel multicasts occurring at any given time. An example of this will now be described with respect to FIG. 3.

Assume for a moment that the read pipe onto the channel and the channel itself support a maximum of 8 channels of streaming data, and that any given target machine can handle a maximum of 2 channels in its write pipe from the channel. Now assume that the selection mechanism 261 determines priority for the common groups of blocks by calculating the product of the size of the common group of blocks times the number of data targets that have the common group of blocks in common, and then assigns priority to the common groups of blocks favoring those with higher products.

In this case, common group of blocks #1 (represented by the lower 10 GB of memory in each data sequence 321 though 324) would have the highest product of 40 GB (10 GB/target times 4 targets). Common group of blocks #2 and #3 would each have the same smaller product of only 10 GB (5 GB per target times 2 targets). The upper 5 GB of each data sequence are not common groups of blocks, and thus may be assigned a product of their actual size of 5 GB (5 GB per target times 1 target).

In order to deliver the location information to the data targets prior to the common groups of blocks, the data source computing system(s) 210 may open a read pipe onto the channel, and use a first of the eight transfer channels on the channel to convey the location information about each common group of blocks to each of the data targets. Each data target may then receive and process the location information in-memory. Since there is no need to write the location information to disk, there is no need for a dedicated write pipe to receive the location information. Thus, when the common groups arrive at the appropriate data targets, the data target will know (using the location information) what addresses to write the common groups to.

Referring back to the common groups, common group of blocks #1 has highest priority since it has the highest product. In that case, the data source computing system(s) 210 would open a second of the eight read channels and read the common group of blocks #1 onto the channel, assuming that the first of the read pipes is still being used to transfer the location information. Each data target would use one of its two available write channels to write the common group of blocks #1 to the data target. In this case, 10 GB is transferred over the channel.

At the same time, the data source computing system(s) 210 would open a third of eight read channels to read the common group of blocks #2 onto the channel 230. The channel would use the third of its eight available transfer channels to provide the common group of blocks #2 to the data targets. The data targets 221 and 222 would use the last of their two write channels to write the common group of blocks #2 off of the channel and into the data target 221 and 222.

Likewise, at the same time, the data source computing system(s) 210 would open a fourth of eight read channels to read the common group of blocks #3 onto the channel 230. The channel would use the fourth of its eight available transfer channels to provide the common group of blocks #3 to the data targets. The data targets 223 and 224 would use the last of their two write channels to write the common group of blocks #3 off of the channel and into the data target 223 and 224.

Depending on the size of common groups of blocks and the relative speed at which transmission on each channel occurs, it may be desirable to parallelize the transmission of location information across more than one channel. The location information may be represented in a very compact form. For instance, suppose the block is a cluster of 4 kilobytes (KB) in size. There may be location information provided for each cluster. Such location information may simply identify itself as being location information, and then specify an address location. This can typically be done in only 4 bytes. Thus, the location information is approximately three orders of magnitude smaller than the actual data it describes, so the introduction of this overhead does not present a problem unless the number of machines sharing a particular run of clusters is truly enormous (approaching a thousand).

This selection mechanism does not use resources with 100% efficiency. There will be times during the overall recovery when all available meta data has been transmitted and the backing store and network are not saturated. However, even with these inefficiencies such an algorithm is a dramatic improvement over a simplistic serialization of restores or a completely parallel but separate process for each data target.

In a serial process assuming write I/O of 2 GB per minute and the example data sequences of FIG. 3, a total of 80 GB would cross the channel, and the four data targets would be provided with all the data sequences (i.e., would be fully restored in a restore environment) in 40 minutes (80 GB divided by 2 GB/minute). In a more efficient parallel process, 4 streams of 20 GB cross the channel simultaneously (totaling still 80 GB) and the process finishes in 10 minutes (20 GB/channel divided by 2 GB/(channel×minute)). Note that pure parallelism would degrade exponentially. In stark contrast, in the example of FIG. 3 using the principles of the present invention, only 40.08 GB cross the channel (10 GB for common group #1, plus 5 GB for common group #2, plus 5 GB for common group #3, plus 5 GB for each of the four individual groups, plus perhaps just 80 megabytes (MB) for the location information). This takes just over 5 minutes to complete the transfer assuming 2 GB per channel transfer rate.

The example chosen above is deliberately simple. In complex environments, the algorithm would have to account for many subtleties. For example, a common group common to 75 data targets might be found, as a common group common to 4 machines. In this case, it may be difficult to determine which common group gets priority. If common group for 75 data targets is only 200 clusters long, and the common group for 4 data targets is 2 million clusters long, then the one with greater bandwidth savings would be the common group for the 4 data targets. However, if 3 of those 4 data targets are already writing at top speed, then this common group may be disqualified. In other words, common groups should be prioritized by expected benefit, not theoretical reuse.

Other extensions to the selection mechanism could accommodate periodic rebalancing as various channels become available and unavailable. If multicasting of a relatively small common group is half finished and a much larger common group comes to the front of the line, perhaps multicasting of the small common group should be abandoned or deferred until the larger common group has been guaranteed the resources to complete multicasting.

A further enhancement could weight common groups on various data targets to favor priority given for the data target itself. For instance, in a restore environment, it is desirable to restore essential servers fasters before less critical servers or desktops. Accordingly, the selection mechanism may favor common groups that are associated with priority data targets such as those that have a higher startup priority.

Furthermore, the selection mechanism may incorporate learned optimizations. Initial guesses about network and I/O performance are unlikely to match final results exactly. An adaptive selection mechanism would likely result in more refined tuning of performance. Accordingly, even after the selection mechanism determines a priority for initiating multicasting of the plurality of common groups of blocks, the selection mechanism may change the priority in response to dynamically changing circumstances, or in response to new learning about current circumstances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for one or more data source computing systems to provide recovery data to a plurality of data targets, the method comprising:

after a plurality of blocks have been backed up, an act of evaluating the plurality of blocks to identify a plurality of common groups of blocks amongst all or a subset of the plurality of data targets;

an act of accessing identification of a plurality of common groups of blocks amongst all or a subset of the plurality of data targets, wherein a first common group of blocks of the plurality of common groups of blocks is common to a different set of the plurality of data targets than a second common group of blocks of the plurality of common groups of blocks; and an act of multicasting the first common group of blocks to a first corresponding subset of the data targets to restore the first common group of blocks to the first corresponding subset of data targets.

2. A method in accordance with claim 1, wherein the act of accessing identification comprises an act of accessing the identification from external to the one or more data source computing systems.

3. A method in accordance with claim 1, wherein the act of accessing identification comprises an act of generating the identification internal to the one or more data source computing systems.

4. A method in accordance with claim 1, further comprising:
an act of multicasting the second common group of blocks to a second corresponding subset of the data targets.

5. A method in accordance with claim 4, further comprising:
an act of using a selection mechanism to determine that the first common group of blocks is to be multicast before the second common group of blocks.

6. A method in accordance with claim 5, wherein the first common group of blocks include at least portions of an operating system, an application program, or configuration information or data for an operating system or an application program.

7. A method in accordance with claim 1, further comprising:
an act of providing first location information to a first data target of the first corresponding subset of the data targets, the first location information specifying at what address(es) to store the first common group of data blocks on the first data target; and
an act of providing second location information to a second data target of the first corresponding subset of data targets, the second location information specifying at what address(es) to store the second common group of data blocks on the second data target, the second location information specifying at least some different addresses than the first location information.

8. A method in accordance with claim 1, wherein an act of evaluating the plurality of blocks to identify a plurality of common groups of blocks is performed periodically.

9. A computer program product comprising one or more computer-readable storage media having computer-executable instructions for performing a method for providing recovery data to a plurality of data targets, wherein the computer-executable instructions are configured such that, when executed by one or more processors of one or more data source computing systems, causes the data source computing systems to perform the method, the method comprising:
an act of accessing identification of a plurality of common groups of blocks amongst all or a subset of the plurality of data targets, wherein a first common group of blocks of the plurality of common groups of blocks is common to a different set of the plurality of data targets than a second common group of blocks of the plurality of common groups of blocks; and
an act of recovering the first common group of blocks by multicasting the first common group of blocks to a first corresponding subset of the data targets.

10. A computer program product in accordance with claim 9, wherein the act of accessing identification comprises an act of generating the identification.

11. A computer program product in accordance with claim 9, the method further comprising:
determining a priority for multicasting the plurality of common groups of blocks.

12. A computer program product in accordance with claim 9, the method further comprising:
an act of providing first location information to a first data target of the first corresponding subset of the data targets, the first location information specifying at what address(es) to store the first common group of data blocks on the first data target; and
an act of providing second location information to a second data target of the first corresponding subset of data targets, the second location information specifying at what address(es) to store the second common group of data blocks on the second data target, the second location information specifying at least some different addresses than the first location information.

13. A method for one or more data source computing systems to provide data to a plurality of data targets, the method comprising:
an act of accessing identification of a plurality of common groups of blocks amongst all or a subset of the plurality of data targets, wherein a first common group of blocks of the plurality of common groups of blocks is common to a different set of the plurality of data targets than a second common group of blocks of the plurality of common groups of blocks;
an act of using a selection mechanism to determine that the first common group of blocks should have multicasting initiated before the second common group of blocks;
an act of multicasting the first common group of blocks to a first corresponding set of the data targets; and
after initiating multicasting of the first common group of blocks, an act of multicasting the second common group of blocks to a second corresponding set of data targets.

14. A method in accordance with claim 13, wherein the selection mechanism uses a startup priority of one or more data targets of the plurality of data targets as a factor in determining a priority for initiating multicasting of the plurality of common groups of blocks.

15. A method in accordance with claim 13, wherein the selection mechanism in adaptable such that although the selection mechanism determines a priority for initiating multicasting of the plurality of common groups of blocks, the selection mechanism may change the priority in response to dynamically changing circumstances, or in response to new learning about current circumstances.

16. A method in accordance with claim 13, wherein the selection mechanism assigns a priority for initiating multicasting of the plurality of common groups of blocks using the size of each of the common groups of blocks, and the number of data targets associated with each of the common groups of blocks as factors.

17. A method in accordance with claim 13, wherein the selection mechanism uses a write speed associated with at least one of the plurality of data targets as a factor in assigning a priority for initiating multicasting of the plurality of common groups of blocks.

18. A method in accordance with claim 13, wherein the first common group of blocks include at least portions of an operating system, an application program, or configuration information or data for an operating system or an application program.

19. A method in accordance with claim 13, further comprising:
an act of providing first location information to a first data target of the first corresponding subset of the data targets, the first location information specifying at what address(es) to store the first common group of data blocks on the first data target; and
an act of providing second location information to a second data target of the first corresponding subset of data targets, the second location information specifying at what address(es) to store the second common group of data blocks on the second data target, the second location information specifying at least some different addresses than the first location information.

20. A computer program product for implementing a method for one or more data source computing systems to provide data to a plurality of data targets, the program product comprising one or more computer-readable storage media having computer executable instructions that, when executed by one or more processors of one or more data source computing systems, causes the one or more data source computing systems to perform the method, the method comprising:

an act of accessing identification of a plurality of common groups of blocks amongst all or a subset of the plurality of data targets, wherein a first common group of blocks of the plurality of common groups of blocks is common to a different set of the plurality of data targets than a second common group of blocks of the plurality of common groups of blocks;

an act of using a selection mechanism to determine that the first common group of blocks should have multicasting initiated before the second common group of blocks;

an act of multicasting the first common group of blocks to a first corresponding set of the data targets; and after initiating multicasting of the first common group of blocks, an act of multicasting the second common group of blocks to a second corresponding set of data targets.

21. A computer program product in accordance with claim 20, wherein the selection mechanism uses one or more of the following factors in assigning a priority for multicasting the plurality of common groups of blocks:

a startup priority of one or more data targets of the plurality of data targets;

a number of data targets associated with one or more of the common groups of blocks; and a write speed associated with at least one of the plurality of data targets.

22. A computer program product in accordance with claim 21, the method further comprising:

an act of providing first location information to a first data target of the first corresponding subset of the data targets, the first location information specifying at what address(es) to store the first common group of data blocks on the first data target; and an act of providing second location information to a second data target of the first corresponding subset of data targets, the second location information specifying at what address(es) to store the second common group of data blocks on the second data target, the second location information specifying at least some different addresses than the first location information.

* * * * *